US008952292B2

(12) United States Patent
Behmlander et al.

(10) Patent No.: US 8,952,292 B2
(45) Date of Patent: Feb. 10, 2015

(54) ADJUSTABLE WELDING HEAD FOR MULTIPLE ELECTRODE CLADDING

(75) Inventors: Matthew J. Behmlander, Metamora, IL (US); Huijun Wang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 144 days.

(21) Appl. No.: 13/448,493

(22) Filed: Apr. 17, 2012

(65) Prior Publication Data
US 2013/0270243 A1    Oct. 17, 2013

(51) Int. Cl.
| B23K 9/00 | (2006.01) |
| B23K 33/00 | (2006.01) |
| B23K 9/09 | (2006.01) |
| B23K 9/28 | (2006.01) |
| B23K 13/01 | (2006.01) |
| B23K 9/16 | (2006.01) |
| B23K 9/18 | (2006.01) |
| B23K 25/00 | (2006.01) |
| B23K 9/04 | (2006.01) |
| B23K 15/00 | (2006.01) |
| B23K 9/23 | (2006.01) |
| B23K 35/30 | (2006.01) |

(52) U.S. Cl.
USPC ............ 219/136; 219/137 R; 219/137 PS; 219/137.2; 219/615; 219/617; 219/72; 219/73; 219/73.1; 219/73.11; 219/73.2; 219/73.21; 219/76.1; 219/76.14; 219/121.11; 219/121.13; 219/121.14; 219/121.15; 219/121.16; 219/121.17; 219/139; 219/137 WM; 362/262; 314/5; 59/22

(58) Field of Classification Search
USPC ............ 219/136, 137 R, 137 PS, 137.2, 615, 219/617, 72, 73, 73.1, 73.11, 73.2, 73.21, 219/76.1, 76.14, 121.11, 121.13–121.14, 219/121.15, 121.16–121.17, 139; 362/262; 314/5; 59/22
See application file for complete search history.

(56) References Cited

U.S. PATENT DOCUMENTS

| 1,946,302 | A | | 2/1934 | Weller |
| 2,241,572 | A | * | 5/1941 | Armstrong ................... 219/73 |
| 2,436,387 | A | * | 2/1948 | Harter et al. ................ 219/124.5 |
| 2,596,951 | A | * | 5/1952 | Carpenter et al. ........ 219/124.03 |
| 2,876,330 | A | | 3/1959 | Gustav |
| 3,317,702 | A | * | 5/1967 | Mann ............................ 219/79 |
| 3,385,962 | A | * | 5/1968 | Freeman ..................... 362/262 |
| 3,458,687 | A | * | 7/1969 | Cranch ........................ 219/521 |
| 3,475,582 | A | * | 10/1969 | Cox et al. ..................... 219/119 |
| 3,624,345 | A | | 11/1971 | Armstrong |
| 3,746,833 | A | * | 7/1973 | Ujiie .......................... 219/137 R |
| 3,858,024 | A | * | 12/1974 | Hinden et al. .................. 219/98 |
| 4,096,373 | A | * | 6/1978 | Roith ............................ 219/73 |
| 4,171,477 | A | * | 10/1979 | Funari ....................... 219/56.21 |
| 4,442,340 | A | * | 4/1984 | Kawabata et al. ......... 219/137 PS |
| 4,608,477 | A | * | 8/1986 | Deichelbohrer ............. 219/69.2 |
| 4,645,909 | A | * | 2/1987 | Thoben et al. ................ 219/411 |
| 4,892,990 | A | * | 1/1990 | Acheson ..................... 219/76.14 |

(Continued)

FOREIGN PATENT DOCUMENTS

| DE | 2135149 | 2/1973 |
| GB | 1332915 | 10/1973 |

Primary Examiner — Dana Ross
Assistant Examiner — Gyounghyun Bae
(74) Attorney, Agent, or Firm — Baker Hostetler (57) ABSTRACT

A welding head is provided. The welding head includes a bracket and a plurality of blocks coupled to the bracket. Each of the plurality of blocks has a contact tip. The contact tips are adapted to receive an electrode. Further, at least one of the plurality of blocks is capable of variable positioning relative to the bracket.

19 Claims, 9 Drawing Sheets

(56) References Cited

U.S. PATENT DOCUMENTS

| | | | |
|---|---|---|---|
| 4,952,769 A * | 8/1990 | Acheson | 219/76.14 |
| 5,140,140 A * | 8/1992 | Pollack | 219/137 PS |
| 5,227,601 A * | 7/1993 | Black | 219/61 |
| 5,298,710 A * | 3/1994 | Acheson et al. | 219/76.14 |
| 5,760,360 A * | 6/1998 | Richardson et al. | 219/50 |
| 6,191,379 B1 * | 2/2001 | Offer et al. | 219/75 |
| 7,180,028 B2 * | 2/2007 | Flood et al. | 219/125.1 |
| 7,208,698 B2 * | 4/2007 | Matiash | 219/137.2 |
| 2007/0007265 A1 * | 1/2007 | Myers et al. | 219/137 PS |
| 2010/0301030 A1 * | 12/2010 | Zhang et al. | 219/130.1 |
| 2010/0326963 A1 | 12/2010 | Peters | |
| 2011/0006047 A1 * | 1/2011 | Penrod et al. | 219/137 R |

\* cited by examiner

ADJUSTABLE WELDING HEAD FOR MULTIPLE ELECTRODE CLADDING

TECHNICAL FIELD

The present disclosure relates to welding and more particularly to clad a workpiece using multiple electrodes.

BACKGROUND

A multiple electrode configuration can be used to deposit a cladding layer on a substrate. U.S. Published Application No. 2010/0326963 relates to a welding device including an electrode head adapted to concurrently house an array of associated multiple, continuous-feed electrodes in a spaced apart configuration for concurrently depositing cladding material on the surface of a workpiece.

SUMMARY OF THE DISCLOSURE

In one aspect of the present disclosure a welding head is provided. The welding head includes a bracket and a plurality of blocks coupled to the bracket. Each of the plurality of blocks has a contact tip. The contact tips are adapted to receive an electrode. Further, at least one of the plurality of blocks is capable of variable positioning relative to the bracket.

In another aspect, a method for depositing a cladding material on a workpiece is provided. The method provides a welding head having a bracket and a plurality of blocks coupled to the bracket. The method receives an electrode in a contact tip affixed to each of the plurality of blocks. Then, the method adjusts a positioning of at least one of the plurality of blocks relative to the bracket based on one or more parameters. Subsequently, the method deposits the cladding material on the workpiece.

Other features and aspects of this disclosure will be apparent from the following description and the accompanying drawings.

DETAILED DESCRIPTION

Figure 1:
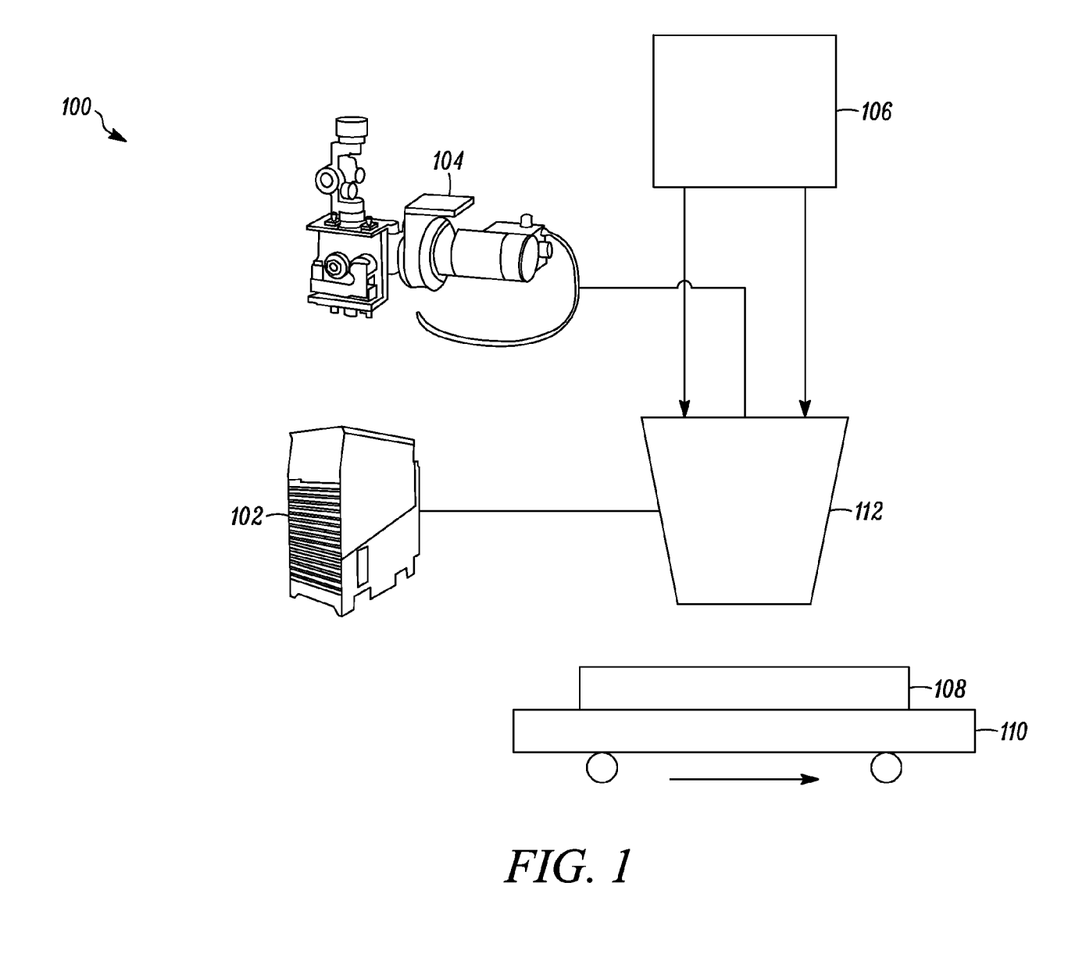
FIG. 1 is an exemplary cladding machine, according to one embodiment of the disclosure.

FIG. 1 is an exemplary cladding machine 100 according to one embodiment of the present disclosure. The cladding machine 100 may include a power source 102, a wire feeder 104, a flux system 106, and a travel carriage 110. The cladding machine 100 may be used to deposit a hardfacing (hereinafter interchangeably referred to as cladding) material on a workpiece 108 using submerged arc welding or any other known welding process.

The power source 102 may be connected to a welding head 112 as shown in FIG. 1. In one embodiment more than one power source 102 may be used. A person of ordinary skill in the art will appreciate that two to eight electrodes may be powered by a single power source 102. The power source 102 may either be a DC or AC power source such that a controlled voltage and welding current is maintained during a cladding process. The power source 102 in conjunction with the wire feeder 104 may be configured to supply filler material or electrodes to the welding head 112. In one embodiment, the electrodes may be fed into a single molten pool using a common potential.

The flux system 106 may provide a granular mineral material or flux for covering the workpiece 108 or tip of the electrode. It should be noted that the power source 102, the wire feeder 104 and flux system 106 may either be regarded as part of or external to the cladding machine 100. As shown in FIG. 1, in one embodiment, the cladding machine 100 may include the travel carriage 110 or positioner on which the workpiece 108 is placed. The direction of movement of the travel carriage 110 is depicted by an arrow in the accompanied figure. The movement of the travel carriage 110 may either be controlled manually or automatically. Parameters such as travel speed and direction may vary. It should be noted that the travel speed may determine thickness of a cladding layer formed on the workpiece 108. A person of ordinary skill in the art will appreciate that the setup described herein is merely on an exemplary basis and does not limit the scope of this disclosure. It may be understood that the cladding machine 100 may include additional components or subsystems as known in the art.

The cladding machine 100 further includes the welding head 112 which may be attached to the cladding machine 100 by any suitable connecting method such as by bolting, riveting, welding or any combination thereof. The welding head 112 is more specifically illustrated in FIGS. 2 to 7. In one embodiment, the welding head 112 may be made of any metal, such as, for example, copper. The welding head 112 includes a bracket 202 and a plurality of blocks 204, 206, 208. The plurality of blocks 204, 206, 208 is coupled to the bracket 202.

Figure 2:
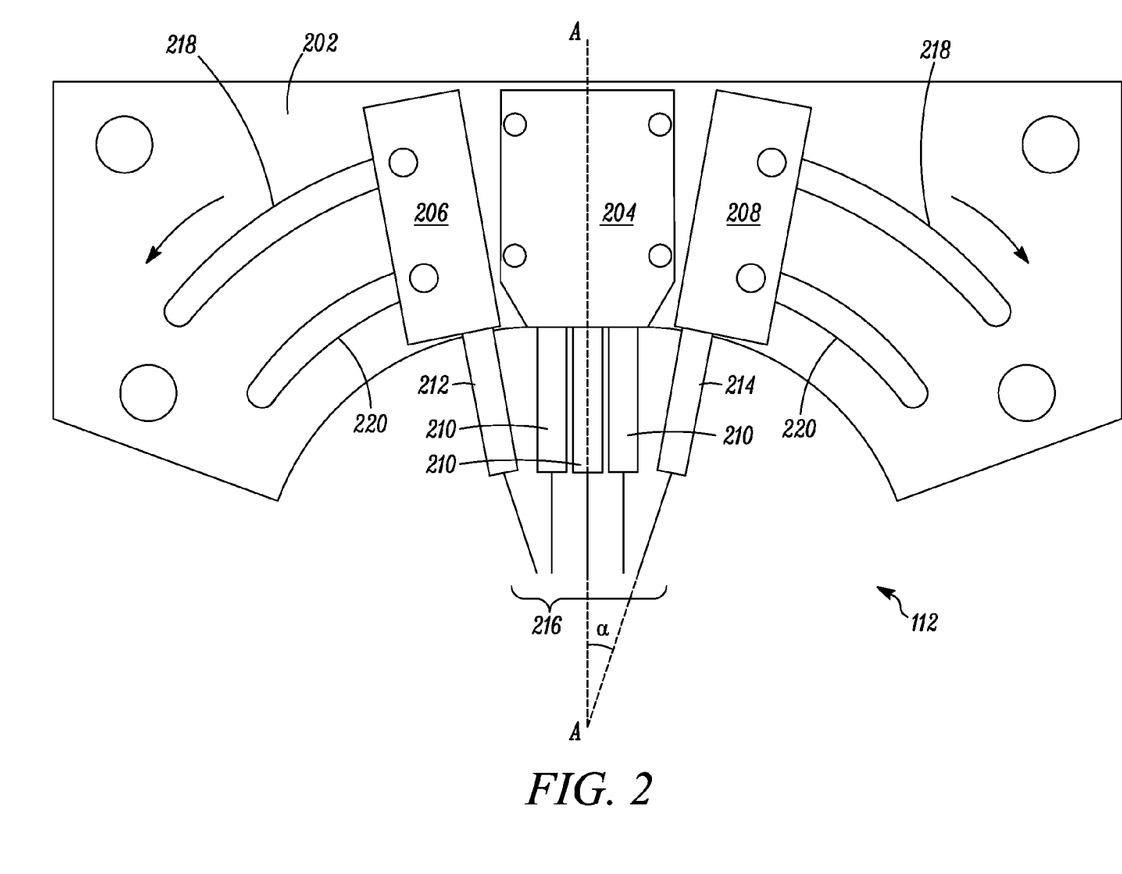
FIG. 2 is a diagrammatic front view of a welding head.
Figure 3:
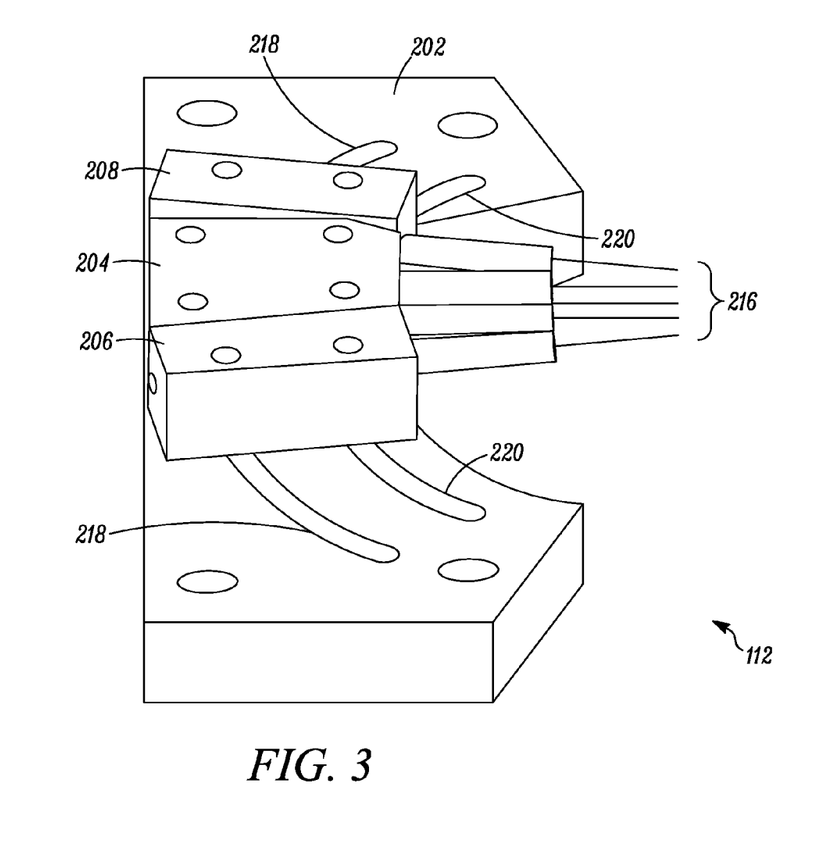
FIGS. 3 to 6 are different views of the welding head of FIG. 2.
Figure 4:
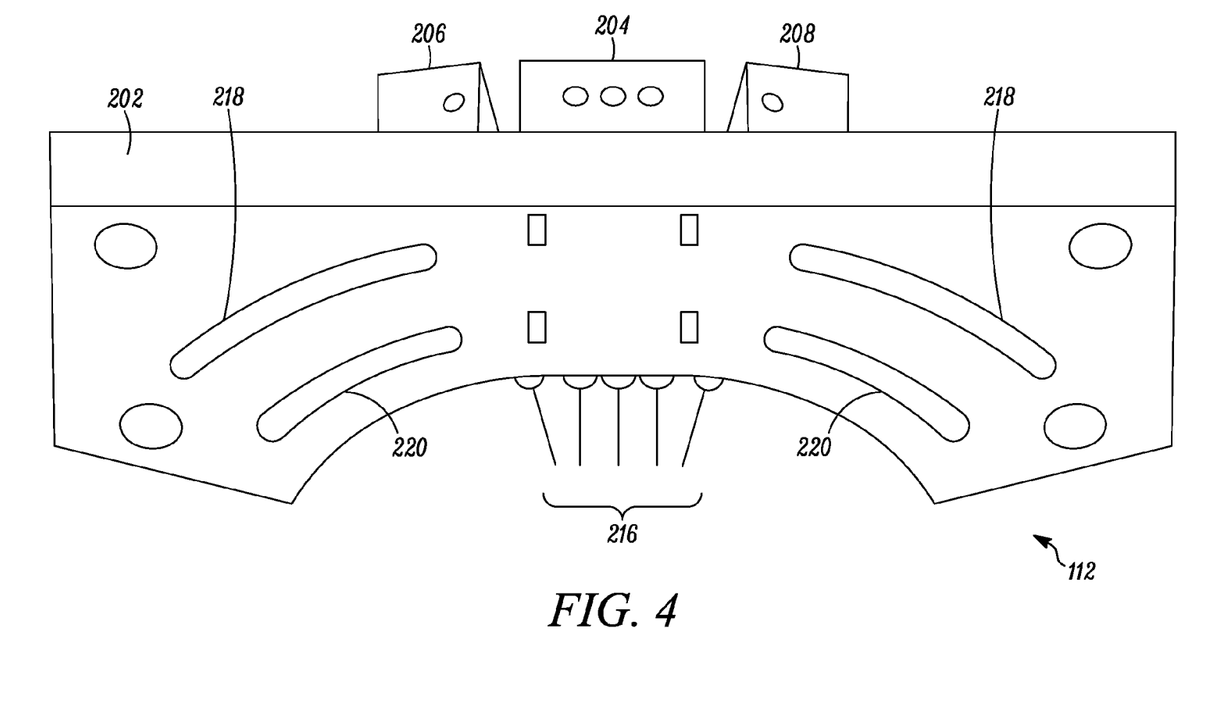
Figure 5:
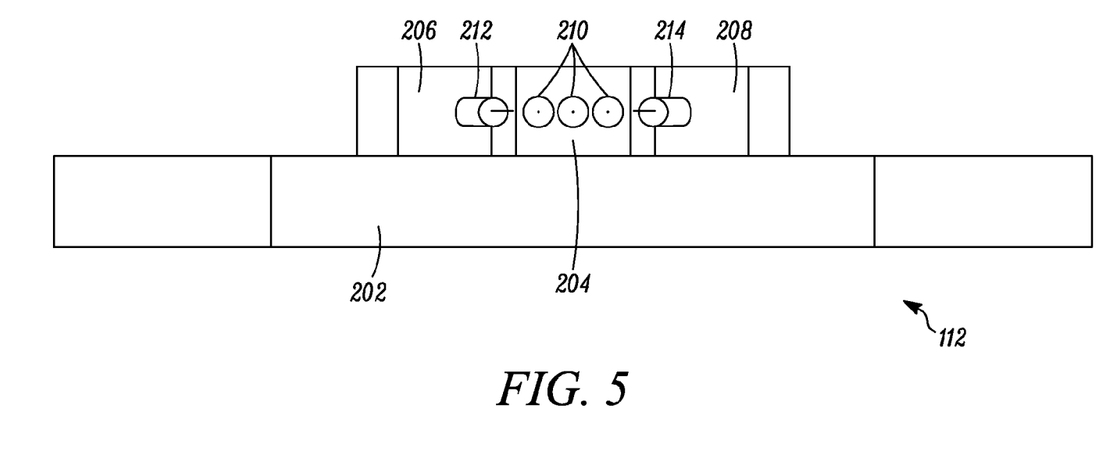
Figure 6:
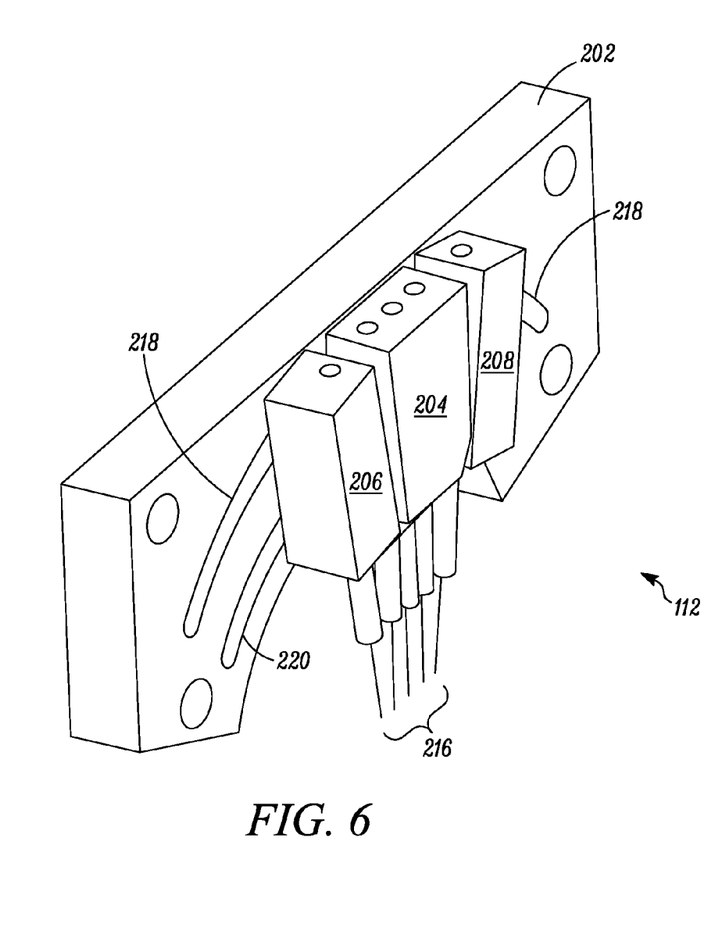

One or more contact tips 210, 212, 214 may be fixedly attached to each of the plurality of blocks 204, 206, 208. Further, each of the contact tips 210, 212, 214 may be adapted to receive an electrode 216. In one embodiment, round electrode chemistries in diameters ranging from 0.6 mm to more than 2.4 mm may be used. The electrode 216 may be gas-shielded, self-shielded, or metal cored. Moreover, the electrode 216 may be solid core, metal core, or flux cored wires.

The present disclosure relates to the welding head 112 having at least one of the plurality of blocks 206, 208 capable of variable positioning relative to the bracket 202. The variable positioning of the at least one of the plurality of blocks 206, 208 may be based on one or more parameters. In one embodiment, the one or more parameters may include a width of the cladding layer, type or shape of the workpiece 108, and the like. It should be understood that other factors not described herein may also be taken into consideration.

Different mechanisms may be utilized in order to vary the positioning of the at least one of the plurality of blocks 206, 208 relative to the bracket 202. In one embodiment, as illustrated in FIGS. 2 to 6, an upper groove 218 and a lower groove 220 may be provided on either side of the bracket 202, such that the at least one of the plurality of blocks 206, 208 may be variably positionable along the upper and lower 218, 220 groove.

As shown in the accompanied figures, the upper and lower groove 218, 220 may be spaced in parallel relation having an arcuate shape. The length, thickness, and/or curvature of the upper and lower groove 218, 220 may be chosen according to the application. It should be noted that other groove variations such as a single continuous groove, one groove each on either side of the bracket 202 or other groove arrangements may also be utilized.

In one embodiment, the welding head 112 may include a central block 204 coupled to the bracket 202. A first block 206 and a second block 208 may be positioned on either side of the central block 204. The central block 204 may have a fixed position relative to the bracket 202. As a result, a position of the contact tips 210 and the corresponding electrodes 216 attached to the central block 214 may be fixed with respect to the bracket 202. The coupling between the central block 204 and the bracket 202 may be provided by welding, bolting, riveting, or any combination thereof.

In the accompanied figures, three contact tips 210 are attached to the central block 204. In one embodiment, the contact tips 210 may be spaced equidistantly. It should be noted that parameters related to the contact tips 210, 212, 214 such as number, length, diameter, spacing, and the like may vary.

The first and second block 206, 208 may be capable of variable positioning relative to the bracket 202. Arrowheads shown in FIG. 2 are indicative of the direction in which movement of the first and second block 206, 208 is possible. Adjusting the position of the first and second block 206, 208 relative to the bracket 202 may involve sliding the first and second block 206, 208 along the upper and lower groove 218, 220 and subsequently locking the first and second block 206, 208 in a determined position.

A person of ordinary skill in the art will appreciate that the coupling between the first and second block 206, 208 and the bracket 202 may be provided by any suitable means known in the art which facilitates in holding the first and second block 206, 208 in place on the bracket 202, once the position of the first and second block 206, 208 relative to the bracket 202 is determined.

As illustrated in FIGS. 2 to 7, in one embodiment, one contact tip 212, 214 may be attached to each of the first and second block 206, 208 respectively. It should also be understood that a position of the contact tips 212, 214 affixed to the first and second block 206, 208 may also be varied based on the variable positioning of the first and second block 206, 208 respectively. The position of the contact tips 212, 214 may in turn determine a position of the electrodes 216 which are attached to the contact tips 212, 214 affixed to the first and second block 206, 208 respectively.

It should be noted that the arcuate shape of the upper and lower groove 218, 220 is such that the first and second block 206, 208 may be radially or angularly adjusted relative to a central axis AA of the bracket 202. Hence, adjusting the position of the first and second block 206, 208 may involve determining an electrode angle α defined between the electrodes 216 attached to the first and second block 206, 208 with respect to the central axis AA of the welding head 112.

In one embodiment, the first and second block 206, 208 may be equally displaced along the upper and lower groove 218, 220, thereby forming a symmetrical arrangement relative to the central axis AA of the welding head 112. It should be understood that the arrangement shown in the accompanied figures is on an exemplary basis. In another embodiment, the position of any one of the first or second block 206, 208 may be adjusted to deposit the cladding material on the workpiece 108.

Figure 7:
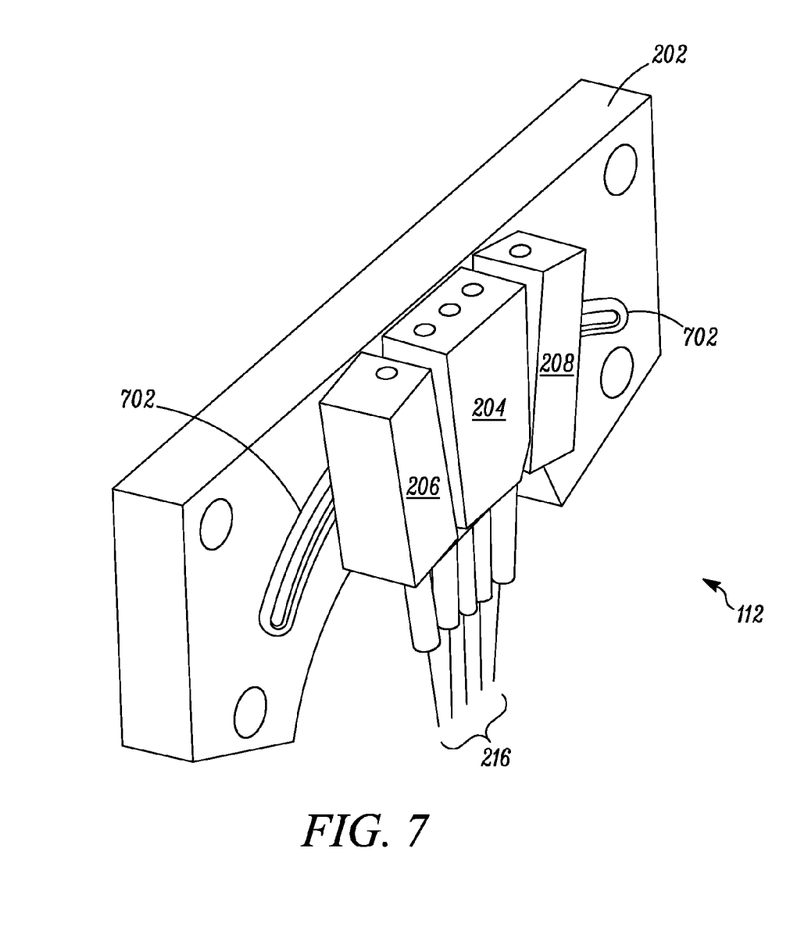
FIG. 7 is a diagrammatic view of another welding head.

Alternatively, another mechanism of variably positioning the first and second block 206, 208 relative to the bracket 202 is illustrated in FIG. 7. As shown in FIG. 7, one or more ridges 702 may be provided on the surface on the bracket 202. In one embodiment, the ridges 702 may be in the shape of an arc as shown in the accompanied figure. A corresponding groove may be present on a back surface of the first and second block 206, 208 facilitating mating of the first and second block 206, 208 with the bracket 202. The first and second block 206, 208 may be variably positioned along the ridges 702 provided on the bracket 202. In another embodiment, after positioning, the first and second block 206, 208 may be held in place using bolts or any other mechanism known in the art. It should be noted that the ridges 702 illustrated in FIG. 7 is merely on an exemplary basis. Shape and dimensions of the ridges 702 may vary without any limitation.

Moreover other mechanisms for variably positioning the first and second block 206, 208 relative to the bracket 202 may also be utilized. In yet another embodiment, the bracket 202 of the welding head 112 may be provided with one or more studs which are spaced apart. Further, a slot may be provided on the back surface of the first and second block 206, 208. The studs may be configured to engage within the slot provided on the first and second block 206, 208 for variably positioning the first and second block 206, 208 relative to the bracket 202. The positioning of the spaced apart studs provided on the bracket 202 of the welding head 112 may correspond to the various positions at which the first and second block 206, 208 may be held on the bracket 202.

In one embodiment, the variable positioning of the first and second block 206, 208 shown in the FIGS. 2 to 7 may be done manually. In another embodiment, the position of the first and second block 206, 208 may be adjusted automatically by a controller (not shown in figures).

The controller may be communicably coupled to an actuator or any other means of mechanically positioning the first and second block 206, 208 of the welding head 112. In one embodiment, an input device may be associated with the controller. Inputs related to the parameters based on which the position of the first and second block 206, 208 are determined may be fed into the input device by an operator. The parameters may include the width of the cladding layer to be deposited on the workpiece 108, the type or shape of the workpiece 108, and the like. It should be understood that other factors may also contribute to the determination.

In one embodiment, signals indicative of these inputs may be sent to the controller. A memory unit which is either intrinsic or extrinsic to the controller may store position co-ordinates for the first and second block 206, 208 or appropriate position determining mappings. The controller may either retrieve the pre-stored position co-ordinates or determine the position of the first and second block 206, 208, based on the mappings and/or received input signals. Subsequently, the controller may send signals to the actuator attached to the first and second block 206, 208 of the welding head 112 to appropriately displace the first and second block 206, 208 to the determined position. After positioning the first and second block 206, 208 in the determined position, any locking mechanism known in the art may be utilized to ensure that the first and second block 206, 208 are held in place.

The controller may embody a single microprocessor or multiple microprocessors that include a means for receiving input and providing output to the actuator attached to the welding head 112 of the cladding machine 100. It should be appreciated that the controller may readily embody a general machine microprocessor capable of other functionalities.

A person of ordinary skill in the art will appreciate that the arrangements shown in FIGS. 2 to 7 is on an exemplary basis and does not limit the scope of this disclosure. The shape and dimensions of the welding head 112 and the upper and lower groove 218, 220 may vary without any limitation.

Figure 8:
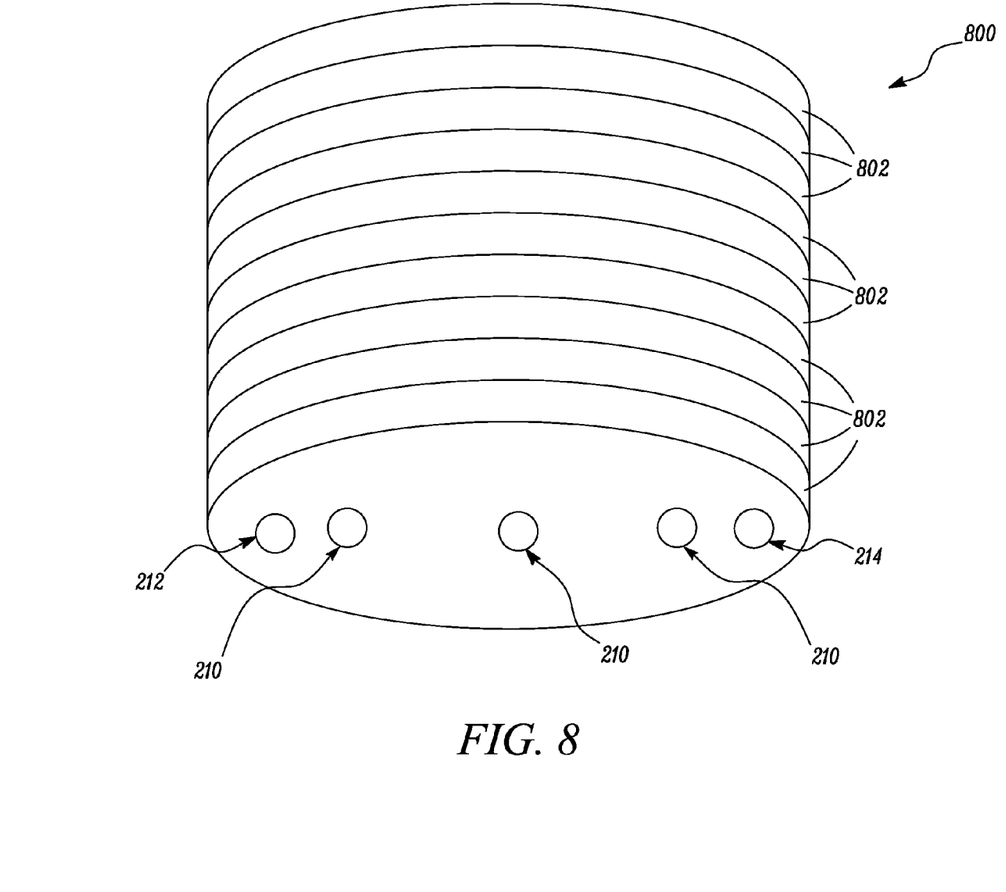
FIG. 8 is diagrammatic representation of a clad bead at a given instant of time.

FIG. 8 illustrates a diagrammatic representation of an isolated clad bead 800 at any given instant in time. The clad bead 800 may include layers of molten pools 802, as shown in FIG. 8. The clad bead 800 may represent a clad area which is deposited on the surface of the workpiece 108. In one embodiment, the multiple layers may be deposited in different passes of the welding head 112 over the workpiece 108. The position of the electrodes 216 associated with the contact tips 210, 212, 214 according to the arrangement shown in FIGS. 2 to 7 is also illustrated in FIG. 8.

It should be noted that the disclosure facilitates in the variable positioning of the first and second block 206, 208 such that the electrode angle α with respect to the central axis AA is so determined as to prevent welding defects. Hence, as is clearly visible in FIG. 8, a spacing between the contact tips 212, 214 attached to the first and second block 206, 208 respectively, and the adjacent contact tips 210 attached to the central block 204 is comparatively lesser than the spacing between any two consecutive contact tips 210 attached to the central block 204.

Size of the clad bead 800 formed on the workpiece 108 may be affected by factors such as welding current, arc voltage, wire feeding speed and travel speed. Depending on the number of electrodes 216 used and power utilized, hard faced welds of up to 50 mm or wider may be deposited on the workpiece 108. The thickness of the hard faced welds may range from less than 1 mm to 5 mm or more, depending on the travel speed of the travel carriage 110.

Figure 9:
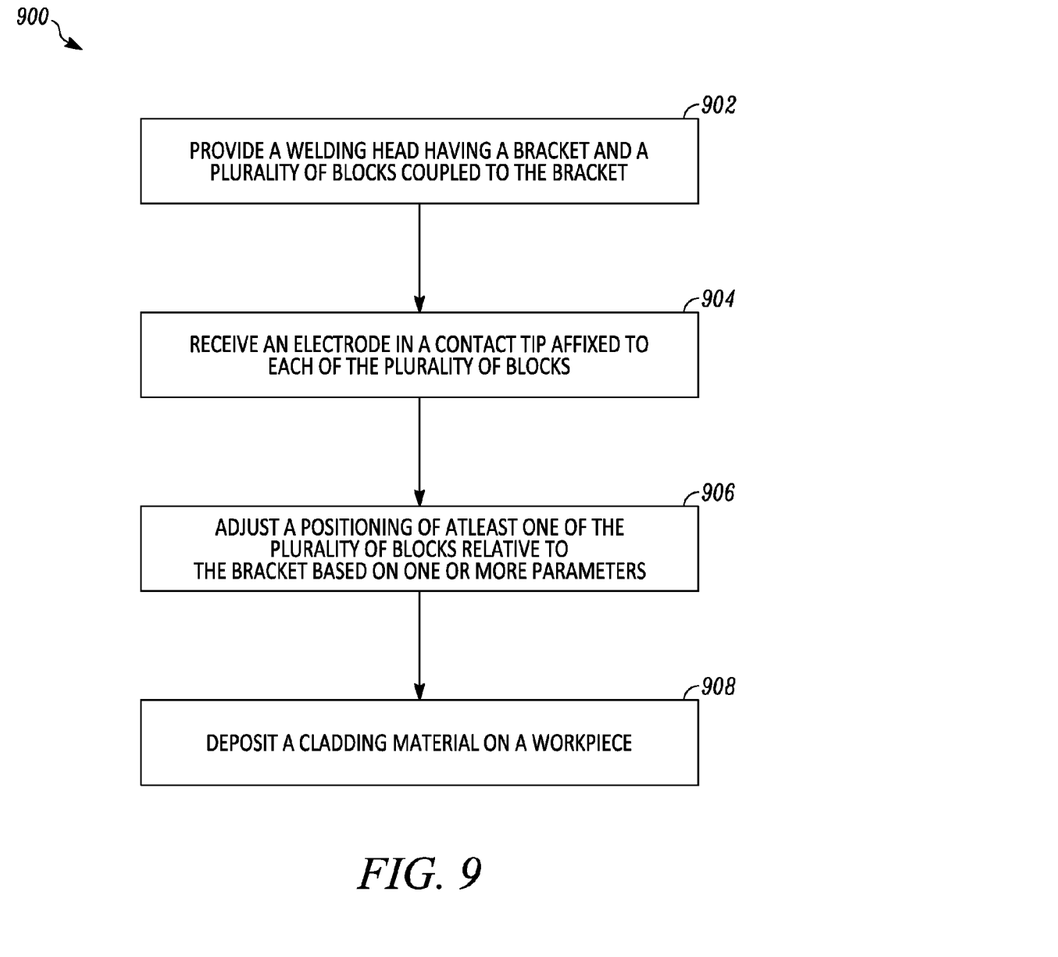
FIG. 9 is a process for depositing a cladding material on a workpiece.

The process of deposition of the cladding material on the workpiece 108 will be described in detail in connection with FIG. 9.

INDUSTRIAL APPLICABILITY

Cladding is used to apply a very hard, wear resistant material on a component to provide improved wear and product performance, or to create buildup of current material, resulting in lower ownership and operating costs. For example, the workpiece 108 having a hardness of approximately RKW C 45 may be cladded with a cladding material having hardness in the range of RKW C 55 to 60, depending on the application.

Typically, cladding using an arrangement having multiple electrodes provides a low cost solution by feeding multiple wires into a single arc, thereby allowing a sufficiently wider clad layer in a single pass at a relatively high deposition rate.

Different multiple electrode arrangements are known in art which include arrangements having the multiple electrodes equally spaced in a linear configuration, or an arrangement in which multiple electrodes are spaced in cluster configuration, and the like. However, in the known multiple electrode configurations a relatively higher rate of wire feed speed is required at outer electrodes of the arrangement. In some instances, the outer electrodes are known to run at up to 150% greater wire feed speed as compared to inner electrodes of the arrangement to prevent weld defects. This in turn causes inconvenience in operation requiring changing of wire spools at different times.

The present disclosure relates to providing an arrangement which facilitates in adjusting a spacing between the plurality of electrodes 216 to create more fill at the edges of the molten pool 802 without using a higher rate of wire feed speed on outer electrodes of the arrangement. As described above, the welding head 112 may include the first and second block 206, 208 which are capable of variable positioning relative to the bracket 202. The design of the welding head 112 allows for adjustment of the electrode angle α of the contact tips 212, 214 affixed to the first and second block 206, 208.

As a result, the electrodes 216 attached to the contact tips 212, 214 may be fed at uniform rates. Feeding each of the electrodes 216 at the same time may prevent the need for extra down time associated with changing wire spools of the wire feeder 104, when the same wire spool size for all electrodes 216 is being used. Additionally, in one embodiment, the ability to adjust the electrode angle α may prevent creation of undercut or other welding defects.

Initially, at step 902 the welding head 112 having the bracket 202 and the plurality of blocks 204, 206, 208 coupled to the bracket 202 is provided. At step 904, the electrodes 216 may be received in the contact tips 210, 212, 214 affixed to the plurality of blocks 204, 206, 208 respectively, via the wire feeder 104. The length, diameter and type of electrode 216 used may be suitably selected.

At step 906, the positioning of the first and second block 206, 208 of the welding head 112 may be adjusted based on one or parameters. The variable positioning of the first and second block 206, 208 may be adjusted based on parameters such as width of the cladding layer, shape or type of the workpiece 108, and the like.

In one embodiment, the positioning may include sliding the first and second block 206, 208 along the upper and lower groove 218, 220 provided on the bracket 202. In another embodiment, the first and second block 206, 208 may be positioned by engaging the ridges 702 provided on the bracket 202 within the grooveprovided on the first and second block 206, 208. As described earlier, the positioning of the first and second block 206, 208 may be done either manually or automatically by the controller.

At step 908, the cladding material may be deposited on the workpiece 108. In one embodiment, the flux system 106 may continuously distribute flux over the workpiece 108 and/or the electrodes 216 before and/or during the cladding process 900. In the submerged arc welding process, a welding arc is established and current flows between the electrodes 216 and the workpiece 108. Heat evolved by the passage of the electric current causes melting of the electrodes 216 creating the molten pool 802.

Moreover, during cladding of the workpiece 108, the electrodes 216 may be fed by the wire feeder 104 at uniform rates. The flux provided by the flux system 106 may cool and harden into a brittle, glass-like material which later is removed from the workpiece 108. It should be noted that the cladding process 900 described herein may be applied to the workpiece 108 prior to heat treatment. The electrodes 216 attached to the welding head 112 may include commercially available round electrodes, or custom round electrodes, not particularly requiring the special use of strip electrodes.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A welding head comprising:
   a bracket; and
   a plurality of blocks coupled to the bracket, each of the plurality of blocks having a contact tip, the contact tips adapted to receive an electrode, wherein at least one of the plurality of blocks is capable of variable positioning relative to the bracket;

the plurality of blocks including a fixed block having a second contact tip;

the bracket defining a central axis, and the contact tips of the fixed block having fixed positions and orientations relative to the central axis; and the at least one block capable of variable positioning being guided via the coupling to the bracket for both translational and rotational movement and positioned by an electronic processor, such that an orientation of the contact tip of the at least one block capable of variable positioning diverges from the orientation of the contact tips of the fixed block and a spacing between the contact tip of the at least one block capable of variable positioning and a contact tip of the fixed block is comparatively lesser than a spacing between the two contact tips of the fixed block to reduce welding defects.

2. The welding head of claim 1, wherein the variable positioning is based on at least one or more parameters.

3. The welding head of claim 2, wherein the at least one or more parameters include at least one of a cladding width and a type of a workpiece.

4. The welding head of claim 1 further including a groove provided on the bracket, wherein the at least one of the plurality of blocks is variably positionable along the groove.

5. The welding head of claim 4, wherein the groove further includes an upper groove and a lower groove, each of the grooves being spaced in parallel relation and having an arcuate shape.

6. The welding head of claim 1, wherein the plurality of blocks includes three blocks.

7. The welding head of claim 6, wherein the three blocks further includes:
   a central block including the fixed block having a fixed position on the bracket; and
   a first and a second outer block including the at least one of the plurality of blocks and capable of variable positioning on the bracket and positioned on either side of the central block.

8. The welding head of claim 1 further including:
   a ridge provided on the bracket, and
   a groove provided on the at least one of the plurality of blocks, wherein the groove is configured to engage with the ridge for variably positioning the at least one of the plurality of blocks relative to the bracket.

9. The welding head of claim 1, wherein the welding head is connected to a power source.

10. The welding head of claim 1, wherein the welding head is connected to a wire feeder.

11. The welding head of claim 1, wherein the welding head is affixed to a cladding machine.

12. The welding head of claim 1, wherein the position of the at least one of the plurality of blocks is adjusted manually.

13. A method comprising:
   providing a welding head having a bracket and a plurality of blocks coupled to the bracket;
   receiving electrodes in contact tips affixed to each of the plurality of blocks;
   adjusting a positioning of at least one of the plurality of blocks relative to the bracket and to a fixed one of the plurality of blocks based on one or more parameters and by using an electronic processor;
   depositing a cladding material on a workpiece; and
   the adjusting of the positioning further including adjusting both a position and an orientation of the electrode in the contact tip of the adjusted block relative to two electrodes in two contact tips of the fixed block so that the orientation of the contact tip of the adjusted block diverges from an orientation of the two contact tips of the fixed block and positioning the contact tip of the adjusted block so a space between the contact tip of the adjusted block and a contact tip of the fixed block is comparatively lesser than a spacing between the two contact tips of the fixed block to reduce welding defects.

14. The method of claim 13, wherein the one or more parameters include at least one of a cladding width and a type of the workpiece.

15. The method of claim 13, wherein adjusting a positioning of the at least one of the plurality of blocks further includes sliding the at least one of the plurality of blocks along a groove provided on the bracket.

16. The method of claim 13, wherein adjusting a positioning of the at least one of the plurality of blocks further includes engaging a ridge provided on the bracket within a groove provided on the at least one of the plurality of blocks.

17. The method of claim 13 further including determining an electrode angle relative to a central axis of the welding head.

18. The method of claim 13 further including feeding the contact tip at a uniform rate.

19. A cladding machine comprising:
   a power source;
   a wire feeder;
   a flux system;
   a travel carriage; and
   a welding head affixed to the cladding machine, the welding head including:
      a bracket; and
      a plurality of blocks coupled to the bracket, each of the plurality of blocks having a contact tip, the contact tips adapted to receive an electrode, wherein at least one of the plurality of blocks is capable of variable positioning relative to the bracket;
      the plurality of blocks including a fixed block having a second contact tip;
      the bracket defining a central axis, and the contact tips of the fixed blocking having fixed positions and orientations relative to the central axis; and
      the at least one block capable of variable positioning being guided via the coupling to the bracket for both translational and rotational movement and positioned by an electronic processor, such that an orientation of the contact tip of the at least one block capable of variable positioning diverges from the orientation of the contact tips of the fixed block and a spacing between the contact tip of the at least one block capable of variable positioning and a contact tip of the fixed block is comparatively lesser than a spacing between the two contact tips of the fixed block to reduce welding defects,
   wherein the positioning of the at least one block capable of variable positioning is adjusted by an electronic processor.

* * * * *